(12) United States Patent
Weir

(10) Patent No.: US 6,543,377 B1
(45) Date of Patent: Apr. 8, 2003

(54) BOAT RELEASE APPARATUS

(76) Inventor: Brett H. Weir, 374 Minz Park Cir. #3, West Bend, WI (US) 53095

( * ) Notice: Subject to any disclaimer, the term of this patent is extended or adjusted under 35 U.S.C. 154(b) by 0 days.

(21) Appl. No.: 10/035,980

(22) Filed: Dec. 31, 2001

(51) Int. Cl.[7] .................................................. B60P 3/10
(52) U.S. Cl. ..................................... 114/344; 280/414.1
(58) Field of Search .............................. 114/343, 344, 114/230.1, 230.2, 378; 280/414.1, 414.3

(56) References Cited

U.S. PATENT DOCUMENTS

| | | | |
|---|---|---|---|
| 3,951,433 A | | 4/1976 | Starkey .................. 280/414 R |
| 4,198,748 A | * | 4/1980 | Lewis .......................... 30/180 |
| 4,463,965 A | * | 8/1984 | Lawson .................... 280/414.1 |
| 4,623,161 A | * | 11/1986 | Sprague ................... 280/414.1 |
| 4,974,865 A | * | 12/1990 | Capps ...................... 280/414.1 |
| 5,154,564 A | | 10/1992 | Koch .......................... 414/506 |
| 5,537,896 A | * | 7/1996 | Halder ........................... 81/26 |
| 5,957,075 A | * | 9/1999 | Byrne et al. .............. 114/230.2 |
| 6,367,779 B1 | * | 4/2002 | Martin et al. ................ 254/243 |

* cited by examiner

Primary Examiner—Stephen Avila
(74) Attorney, Agent, or Firm—Donald J. Ersler

(57) ABSTRACT

A boat release apparatus preferably includes a tube body, an actuation rod, and a hook assembly. The actuation rod is sized to be received by an inside perimeter of the tube body. The hook assembly is pivotally attached to one end of the tube body. The hook assembly includes a hook body, a pivot hook, and a release hook. The pivot hook is pivotally attached to one end of the hook body. The release hook is pivotally attached to the other end of the hook body. One end of a release cable is attached to one end of the actuation rod and the other end of the release cable is attached to the release hook. A handle is preferably attached on one end of the actuation rod. Pulling the handle will cause the release hook to retract. However, the length of the release cable may be increased such that it is long enough to be attached directly to the handle, thus eliminating the need for the actuation rod. Preferably, the release hook is attached to a crank hook and the pivot hook is attached to an eye-bolt on the front of a boat.

10 Claims, 5 Drawing Sheets

BOAT RELEASE APPARATUS

BACKGROUND OF THE INVENTION

1. Field of the Invention

The present invention relates generally to launching a boat from a trailer and more specifically to a boat release apparatus for guiding a boat once it has been released into the water from a trailer.

2. Discussion of the Prior Art

It appears that there are no stand alone devices on the market which may be used to guide a boat once it has been released into water from a trailer. There are at least two trailers with a launching device included as an integral part of the trailer such as U.S. Pat. No. 3,951,433 to Starkey and U.S. Pat. No. 5,154,564 to Koch. However, these two trailers do allow the user to manipulate the position of the boat once it is released from the trailer.

Accordingly, there is a clearly felt need in the art for a boat release apparatus which may be used to guide a boat during launching and which may be used to pull the boat back on to a trailer.

SUMMARY OF THE INVENTION

The present invention provides a boat release apparatus which may be used to guide a boat during launch and retrieval. The boat release apparatus preferably includes a tube body, an actuation rod, and a hook assembly. An outer perimeter of the actuation rod is sized to be received by an inside perimeter of the tube body. The hook assembly is pivotally attached to one end of the tube body. The hook assembly includes a hook body, a pivot hook, and a release hook. The pivot hook is pivotally attached to one end of the hook body. The release hook is pivotally attached to the other end of the hook body. Preferably, one end of a release cable is attached to one end of the actuation rod and the other end of the release cable is attached to the release hook. A handle is preferably attached on the other end of the actuation rod. Pulling the handle will cause the release cable to retract the release hook. However, the length of the release cable may be increased such that it is long enough to be attached directly to the handle, thus eliminating the need for the actuation rod.

The boat release apparatus is preferably used in the following manner. When launching a boat from a trailer, the pivot hook is attached to an eye-bolt on the boat and the release hook is attached to a crank hook at the end of a crank line. The pivot and release hooks will stay attached to the crank hook and the eye-bolt, respectively as the boat is launched. When the boat has been launched a sufficient distance, the release hook is actuated to release thereof from the crank hook. The boat may now be manipulated with the boat release apparatus such that it may be landed on shore. A single person may unload the boat off the trailer and bring it back to shore without wading in water. The boat release apparatus may also be used to aid in putting the boat back on the trailer.

Accordingly, it is an object of the present invention to provide a boat release apparatus which allows a single user to launch a boat from a trailer.

Finally, it is another object of the present invention to provide a boat release apparatus which enables a boat to be launched from a trailer without the launcher having to wade in water.

These and additional objects, advantages, features and benefits of the present invention will become apparent from the following specification.

DETAILED DESCRIPTION OF THE PREFERRED EMBODIMENTS

Figure 1:
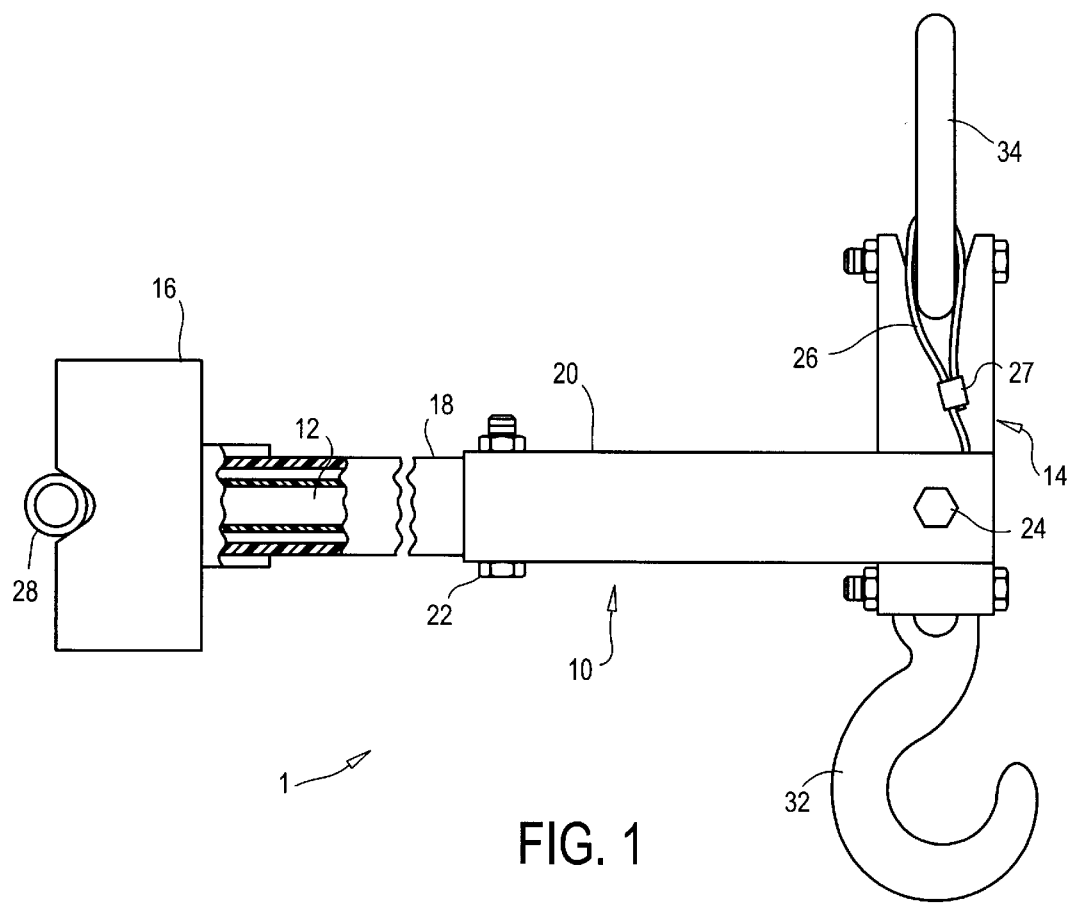
FIG. 1 is a top view of a boat release apparatus in accordance with the present invention.
Figure 2:
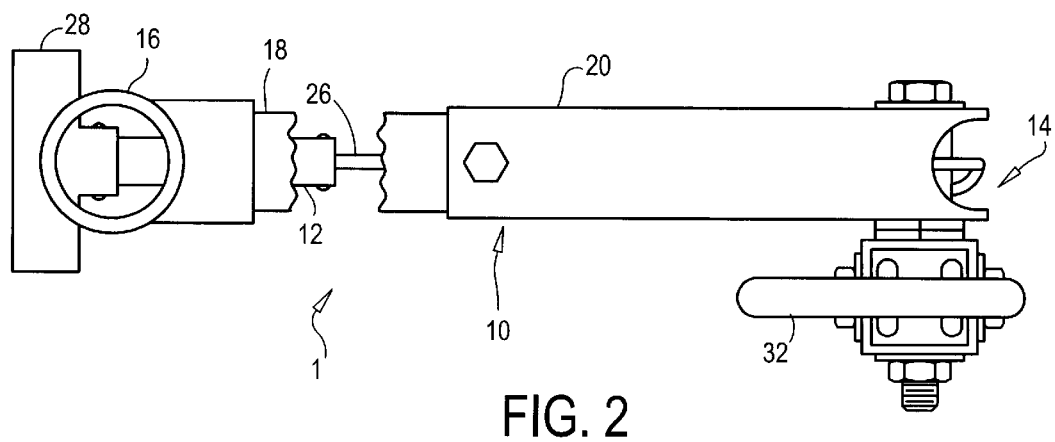
FIG. 2 is a side view of a boat release apparatus in accordance with the present invention.
Figure 3:
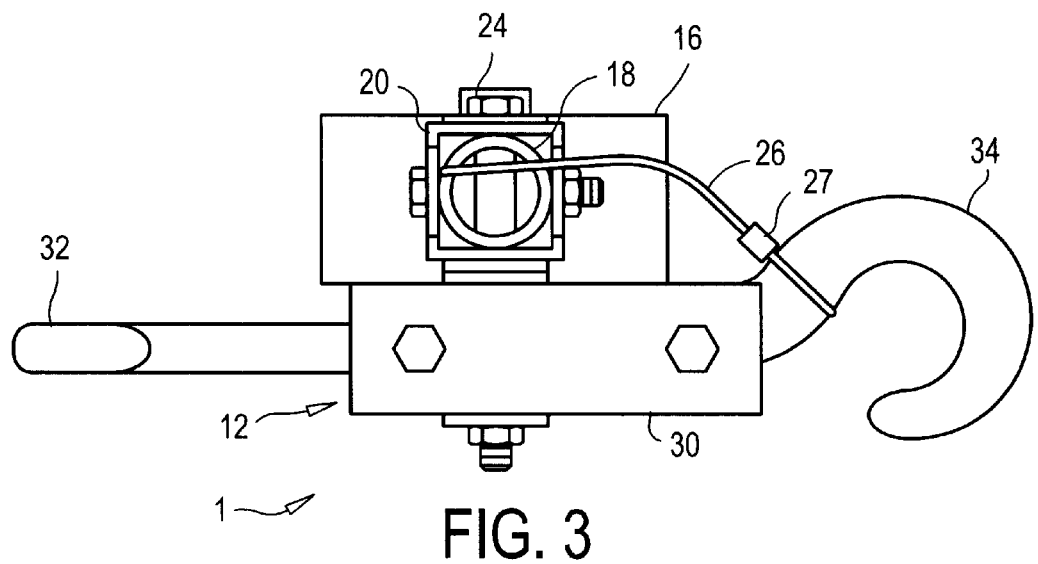
FIG. 3 is an end view of an actuation hook in an engaged position of a boat release apparatus in accordance with the present invention.
Figure 3A:
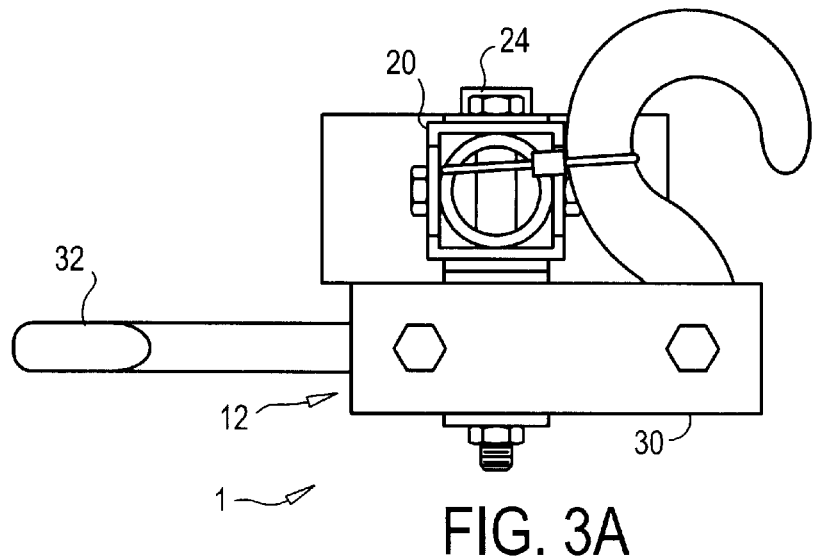
FIG. 3a is an end view of an actuation hook in a retracted position of a boat release apparatus in accordance with the present invention.
Figure 4:
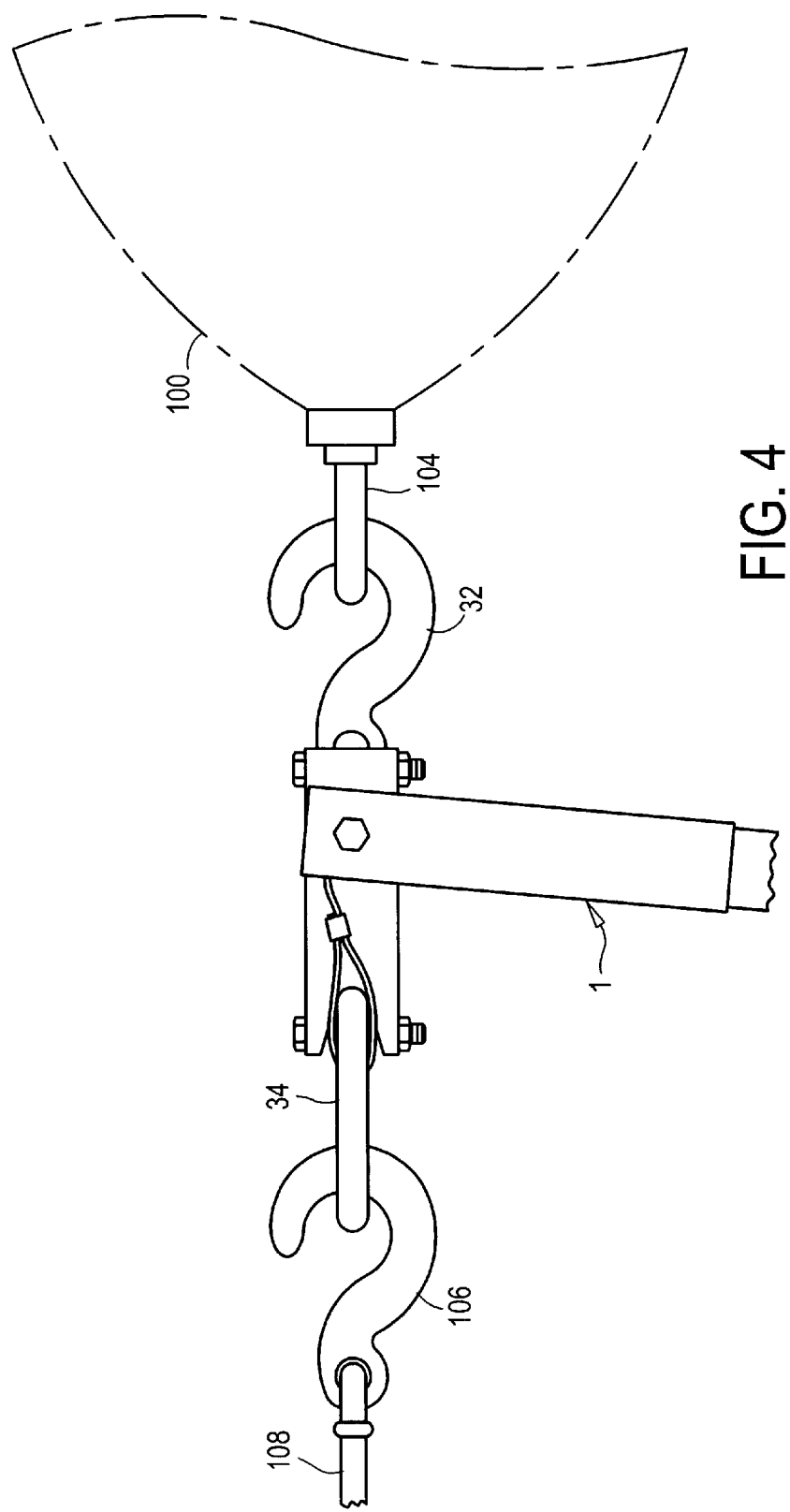
FIG. 4 is an enlarged top view of a hook assembly attached to a crank hook and eye-bolt of a boat in accordance with the present invention.
Figure 5:
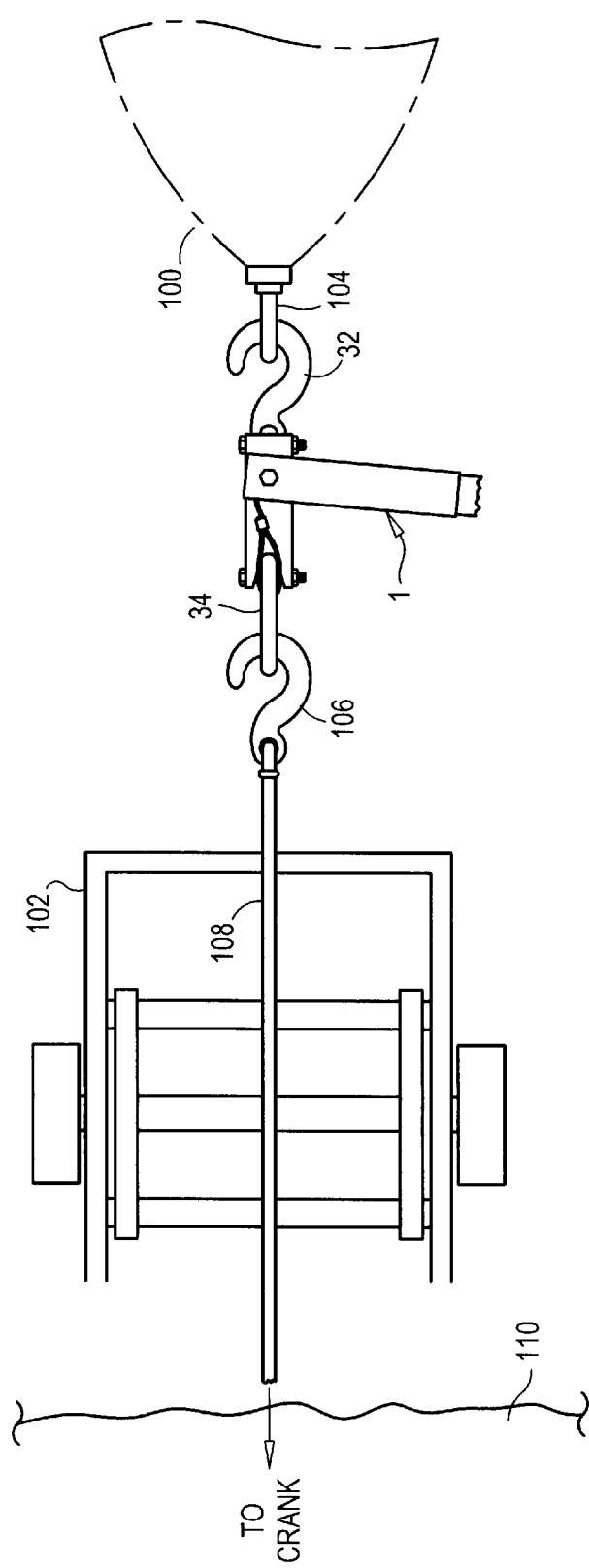
FIG. 5 is a top view of a boat released from a trailer with a boat release apparatus attached thereto in accordance with the present invention.
Figure 6:
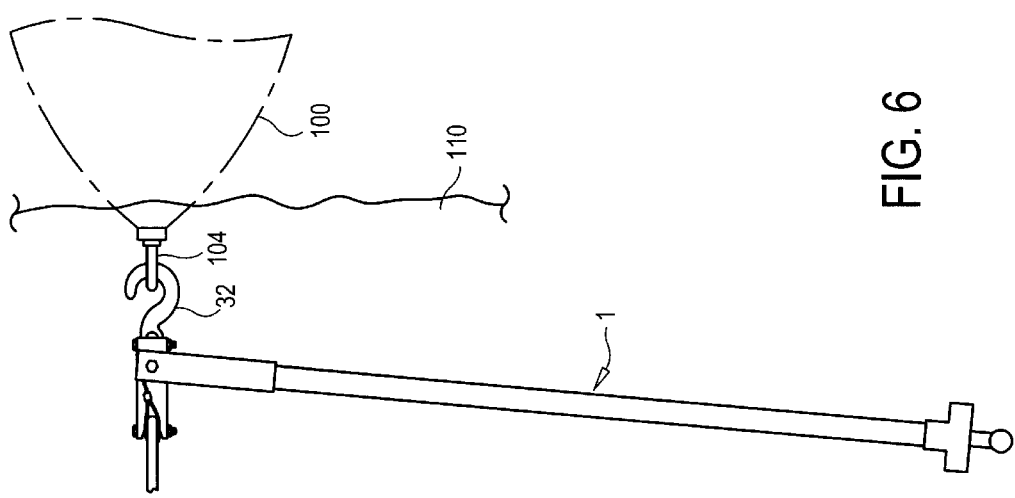
FIG. 6 is a top view of a boat brought to shore with a boat release apparatus attached thereto in accordance with the present invention.

With reference now to the drawings, and particularly to FIG. 1, there is shown a top view of a boat release apparatus 1. With reference to FIGS. 2–3a, the boat release apparatus 1 preferably includes a tube body 10, an actuation rod 12, and a hook assembly 14. Preferably, the tube body 10 includes a T-bracket 16, a support tube 18, and a swivel end 20. The swivel end 20 is preferably attached to one end of the support tube 18 with at least one fastener 22, other attachments methods may also be used. The swivel end 20 provides extra strength to the one end of the support tube 18. However, other methods of strengthening the one end of the support tube 18 may also be used. The T-bracket 16 is preferably attached to the other end of the support tube 18 with adhesive or any other suitable attachment method. The support tube 18 preferably has a length of at least six feet. The hook assembly 14 is pivotally attached to the swivel end 20 with a fastener 24 or the like. An outer perimeter of the actuation rod 12 is sized to be received by an inside perimeter of the support tube 18. Preferably, one end of a release cable 26 is attached to one end of the actuation rod 12 with any suitable attachment method. A handle 28 is preferably attached to the other end of the actuation rod 12 with a pin peened over on both ends, other attachment methods may also be used. The actuation rod 12 is preferably substantially the same length as the support tube 18. However, the length of the release cable 26 may be increased such that it is long enough to be attached directly to the handle 28, thus eliminating the need for the actuation rod 12.

The hook assembly 14 includes a hook body 30, a pivot hook 32, and a release hook 34. The hook body 30 is preferably fabricated from a square tube. The pivot hook 32 is pivotally attached to one end of the hook body 30 with a fastener or the like. The release hook 34 is pivotally attached to the other end of the hook body 30 with a fastener or the like. The figures show that the pivot hook 32 has a perpendicular orientation to the release hook 34. However, the pivot and release hooks should not be limited to this orientation. The pivot hook 32 and release hook 34 could have a parallel orientation or any other orientation. The other end of the release cable 26 is preferably secured to the release hook 34 by wrapping the release cable 26 around the release hook 34 and cinching the release cable 26 to itself with a band 27 or the like. The handle 28 is used to pull the release cable 26 and cause the release hook 34 to retract. The release cable 26 is sufficiently stiff to allow the release hook 34 to be push back to its engaged position.

With reference to FIGS. 4–7, the boat release apparatus 1 is preferably used in the following manner. When launching a boat 100 from a trailer 102, the pivot hook 32 is attached to an eye-bolt 104 on the boat 100 and the release hook 34 is attached to a crank hook 106 at an end of a crank line 108. The pivot hook 32 will stay attached to the eye-bolt 104 and the release hook 34 will stay attached to the crank hook 106 as the boat 100 is launched. When the crank line 108 has been left out a sufficient distance, the release hook 34 is retracted to release thereof from the crank hook 106. The boat 100 may now be manipulated with the boat release apparatus. 1 such that it may be landed on the shore 110. A single person may unload the boat 100 off the trailer 102 and bring it back to shore 110 without wading in water. The boat release apparatus 1 may also be used to aid in putting the boat 100 back on the trailer 102.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A boat release apparatus comprising:

a support tube;

a hook body being pivotally attached to one end of said support tube;

a handle being attached to one end of a release cable;

a pivot hook being pivotally attached to one end of said hook body; and a release hook being pivotally attached to the other end of said hook body, the other end of said release cable being attached to said release hook, wherein pulling said handle causing said release hook to retract.

2. The boat release apparatus of claim 1, further comprising:

one end of an actuation rod being attached to said one end of said release cable and said handle being attached to the other end of said actuation rod.

3. The boat release apparatus of claim 1, further comprising:

a handle being attached to the other end of said actuation rod.

4. The boat release apparatus of claim 1, further comprising:

a swivel end being attached to said one end of said support tube.

5. The boat release apparatus of claim 1, further comprising:

a T-bracket being attached to the other end of said support tube.

6. A boat release apparatus comprising:

a support tube;

an actuation rod which is slidable within said support tube, one end of a release cable being attached to one end of said actuation rod;

a hook body being pivotally attached to one end of said support tube;

a pivot hook being pivotally attached to one end of said hook body; and a release hook being attached to the other end of said hook body, the other end of said release cable being attached to said release hook, wherein pulling said actuation rod causing said release hook to retract.

7. The boat release apparatus of claim 6, further comprising:

a handle being attached to the other end of said actuation rod.

8. The boat release apparatus of claim 6, further comprising:

a swivel end being attached to said one end of said support tube.

9. The boat release apparatus of claim 6, further comprising:

a T-bracket being attached to the other end of said support tube.

10. A method of launching a boat from a trailer without having to wade in water comprising the steps of:

(a) providing a support tube with a hook body pivotally attached to one end thereof, a first hook being pivotally attached to one end of said hook body, a second hook being pivotally attached to the other end of said hook body;

(b) providing a means for retracting said second hook;

(c) attaching said first hook to a front of a boat;

(d) attaching said second hook to a crank hook;

(e) releasing the boat from a trailer into water;

(f) retracting said second hook; and (g) pulling the boat back to shore with said support tube.

* * * * *